(12) United States Patent
Joy

(10) Patent No.: US 7,716,973 B1
(45) Date of Patent: May 18, 2010

(54) MEASUREMENT OF AUTOMOBILE EXHAUST FLOW

(75) Inventor: Robert D. Joy, Marion, IA (US)

(73) Assignee: J-Tec Associates, Inc., Cedar Rapids, IA (US)

( * ) Notice: Subject to any disclaimer, the term of this patent is extended or adjusted under 35 U.S.C. 154(b) by 180 days.

(21) Appl. No.: 11/854,112

(22) Filed: Sep. 12, 2007

Related U.S. Application Data

(60) Provisional application No. 60/825,456, filed on Sep. 13, 2006.

(51) Int. Cl.
*G01M 15/10* (2006.01)
(52) U.S. Cl. .................................... 73/114.69
(58) Field of Classification Search ............... 73/114.69, 73/114.76
See application file for complete search history.

(56) References Cited

U.S. PATENT DOCUMENTS

| 4,522,029 A | * | 6/1985 | Tomita et al. | 60/314 |
| 4,539,813 A | * | 9/1985 | Tomita et al. | 60/314 |
| 7,343,778 B1 | * | 3/2008 | Joy | 73/23.31 |

* cited by examiner

*Primary Examiner*—Eric S McCall
(74) *Attorney, Agent, or Firm*—Brett D. Papendick; Shuttleworth & Ingersoll, PLC

(57) ABSTRACT

A method of overcoming the problems of measuring the exhaust flow during pulsating and reversing flow by placing a "box" in series within a few feet of the connecting pipe to serve as a filter. The box is constructed with soft expandable sides, so it can expand with the pressure pulsations and then contract, creating a very smooth flow that can be measured with a measuring device at the exit of the flow from the box.

7 Claims, 4 Drawing Sheets

VORTEX FLOWMETER OUTPUT WITH STEADY FLOW

VORTEX FLOWMETER OUTPUT FOR PULSATING AUTOMOBILE ENGINE EXHAUST FLOW

VORTEX FLOWMETER OUTPUT FOR PULSATING EXHAUST FLOW WITH SMOOTHING FILTER

MEASUREMENT OF AUTOMOBILE EXHAUST FLOW

This application claims the benefit of provisional patent application No. 60/825,456 filed Sep. 13, 2006.

BACKGROUND OF THE INVENTION

The measurement of automobile exhaust flow poses many problems. At high flows the gas temperature is high, reaching up to 1200° F. for high speed, high load conditions. At idle, the temperature is lower, but the flow pulsates, and in some cases actually reverses between the gas out flow bursts. This condition is more pronounced for four cylinder engines. In addition, the dew point of the exhaust gas is in the order of 150 to 170° F. In emission measurements, where it is necessary that the chemical composition of the exhaust gas not be changed, it is necessary for the measurement devices to be heated to above the gas dew point.

The pulsating nature of the exhaust at idle conditions poses the most severe problems to current measurement systems. To understand the nature of this flow, consider the automobile engine. After the cylinder fires, the exhaust valve opens and the piston expels the gas. Then the valve closes; however, the inertia of the flowing gas continues to push the gas out the tail pipe, while creating a vacuum in the exhaust manifold. As the force of the vacuum overcomes that of the gas inertia, the flow reverses, pulling some gas back into the exhaust manifold and, under certain conditions, may pull outside air back into the tail pipe. As the engine speed increases, the exhaust valve openings occur closer together and eventually overcome the time constant of the exhaust system. Engine manufacturers make use of this effect to increase low end torque by "tuning the exhaust ports". Obviously, this effect is more pronounced for 4 cylinder engines than for 6 or 8 cylinder engines.

The majority of the measuring systems use unidirectional flow measurement devices. Since many of these devices sense pressure changes across a orifice or nozzle, the outputs of which are proportional to the square of the gas flow rate, pulsating unidirectional flow alone can cause errors, since the average pressure is not proportional to the square of the average gas flow. Other devices which do not have the non-linearity of the differential pressure can be used, but if there is flow reversal during the exhaust cycle, these devices measure the outgoing flow, then measure it a second time when the reversed gas exits for the second time. Typical errors due to this problem can run as high as 40 to 50%. Examples of this type of meter and its performance under idle conditions are described in the following paragraphs.

One gas flow sensor is the Vortex meter which consists of a non-streamlined strut held in the flow stream. As the flow passes this strut, vortices are formed and are shed behind the strut. Downstream a short distance is an ultrasonic beam, which intercepts the vortices as they pass. Descriptions of this measuring technique are contained in Joy et al U.S. Pat. No. 3,680,375, Joy U.S. Pat. No. 4,437,349, Joy et al U.S. Pat. No. 4,240,299, Joy et al U.S. Pat. No. 3,979,309, and in the Society of Automotive Engineers publication "Vortex flow-meter applications to automobile engine control", R. D. Joy, 1975.

This type of sensor produces a sine wave type output, with the frequency of the sine wave being linearly proportional to the volumetric flow rate of the gas and independent of the gas composition. An example of the sensor output under steady flow is shown in FIG. 1 of the drawings.

However, under pulsating exhaust flow of a 2.0 liter four cylinder engine, the sensor output is shown in FIG. 2. The engine was running at about 750 RPM, and with two cylinder firings per revolution, there would be about 25 exhaust bursts per second. The scale on the second plot runs from 0 to 80 milliseconds, so the two bursts represent two exhaust valve openings. In between the two bursts are some indication of reverse flow occurring. Counting the zero crossings shown in this figure indicates a flow rate of about 30 cubic feet per minute (CFM). However, it was known that the actual exhaust rate should be between 5 and 10 CFM.

In the past, a common practice to measure the low flow was to run the exhaust flow through one or two barrels, which, combined with the flow resistance in the connecting pipes, created a smoothing filter. With this technique, the measurement device is placed at the exit of the last barrel, where the flow is smooth and continuous. While this approach can be used to measure the low speed exhaust rate, it has the disadvantages of imposing a time lag of several seconds on the flow, which prevents measurement of rapid flow changes. Also, because the barrels and connecting pipes were difficult to heat, condensation occurred, changing the chemical analysis of the gas, which analysis is required under EPA vehicle certification. Consequently, the automobile industry was forced to collect the exhaust gas in large plastic bags, and, to prevent condensation, to add dry air of a known amount to lower the dew point of the mixture below ambient temperatures.

While this has worked for several years, it has become difficult to handle because the added dry air in many cases is now more "dirty" than the exhaust gas emitted by the engine. The industry is now developing a "clean air system" to remove the hydrocarbons and nitrous oxide compounds.

The test method preferred by both the automobile industry and the EPA is to directly measure the exhaust flow rate without allowing condensation, and withdrawing a small gas sample proportional to the flow rate for analysis. Then, using a dynamometer, the engine is put through a simulated driving cycle containing a number of rapid accelerations, which must be followed by the exhaust flow device. There is therefore a need for an improved technique for measuring automobile exhaust flow.

SUMMARY OF THE INVENTION

The method of the invention overcomes the problems of measuring the exhaust flow during pulsating and reversing flow by placing a "box" in series within a few feet of the is connecting pipe to serve as a filter. The box is constructed with soft expandable sides, so it can expand with the pressure pulsations and then contract, creating a very smooth flow that can be measured with a measuring device at the exit of the flow from the box.

DESCRIPTION OF THE INVENTION

An investigation was made into ways to prevent the reverse and pulsating flows without imposing long time delays. Some slight improvements were observed when the measurement device was separated from the automobile tailpipe, but this method was not entirely successful in achieving the desired goals.

The method of the invention comprises placing a "box" in series within a few feet of the connecting pipe to serve as a filter. The box is constructed with soft expandable sides, so it can expand with the pressure pulsations and then contract, creating a very smooth flow. Initial tests were performed using cardboard boxes with dimensions of: 18×12.5×16 inches, 14×12×8 inches, 6.25×9.5×10 inches and 12×18×8 inches. The results of these tests showed good performance for all the boxes except for the 6.25×9.5×10 inch box. The volume of the box must be a minimum of 1700 cubic inches. Obviously, since cardboard boxes cannot be used in actual operations, three additional boxes were constructed during the test runs, each having dimensions of 12×12×12 inches, but using a covering of stainless steel of different thicknesses of 0.005, 0.010 and 0.015 inches. The thinner stainless steel coverings performed very well, with decreasing smoothing of the flow for the thicker coverings. However, the performance of the 0.010 inch covering appeared adequate for the testing on the four cylinder engine and was more durable than the thinner material.

In order to protect the box from damage, it is preferred to cover the thin stainless steel material with a perforated steel protective cover that is placed around all the box sides, but spaced slightly away from the thin stainless steel material of the sides. By positioning the protective cover close to the thin material of the box, this will protect the box from pressures in the result of an engine that backfires. The perforation or holes in the protective cover serve to allow air to escape as the box expands.

Figure 1:
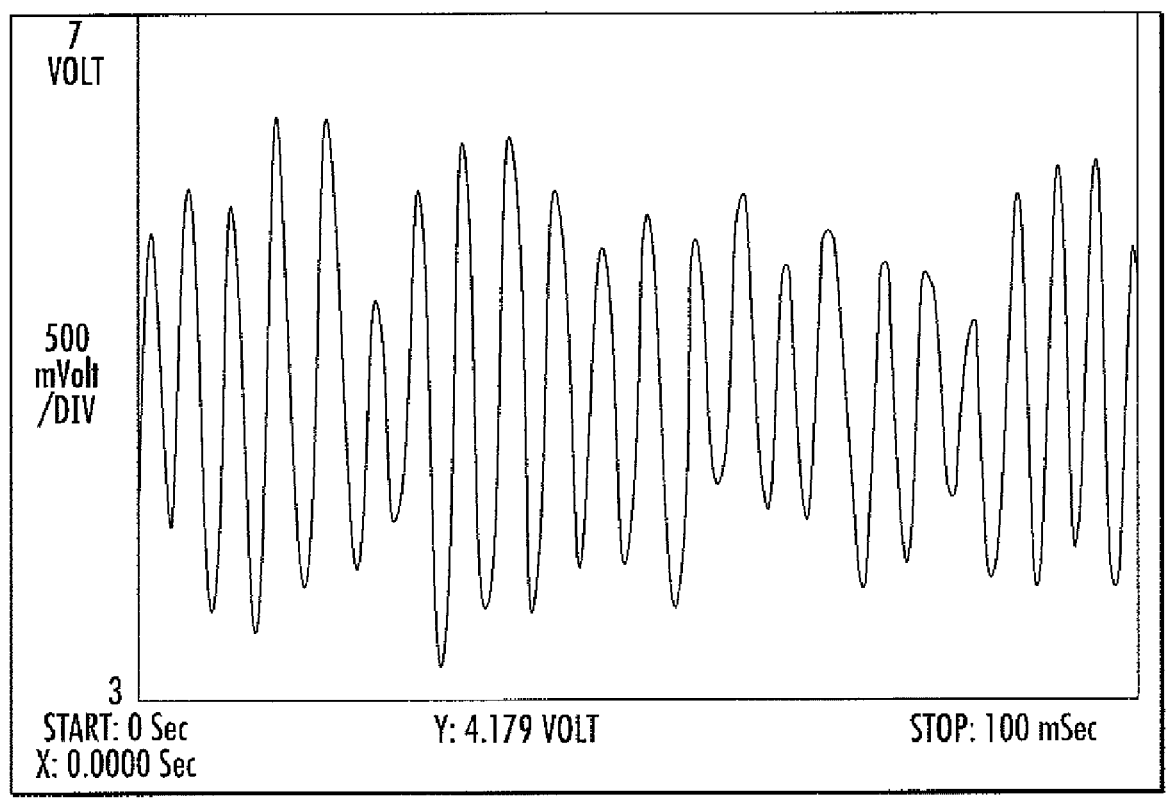
FIG. 1 is a graph showing the vortex flow-meter output of automobile exhaust flow under steady flow conditions.
Figure 2:
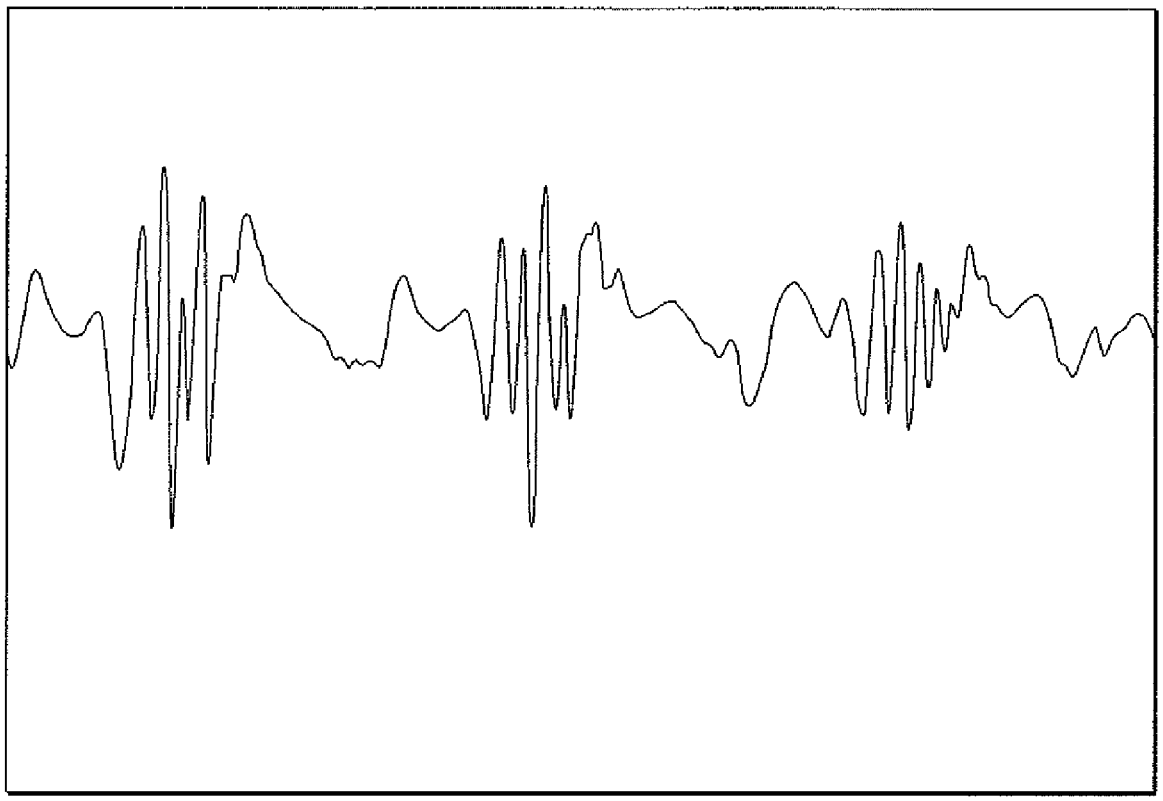
FIG. 2 is a graph showing the vortex flow-meter output of the automobile exhaust flow under pulsating flow conditions.
Figure 3:
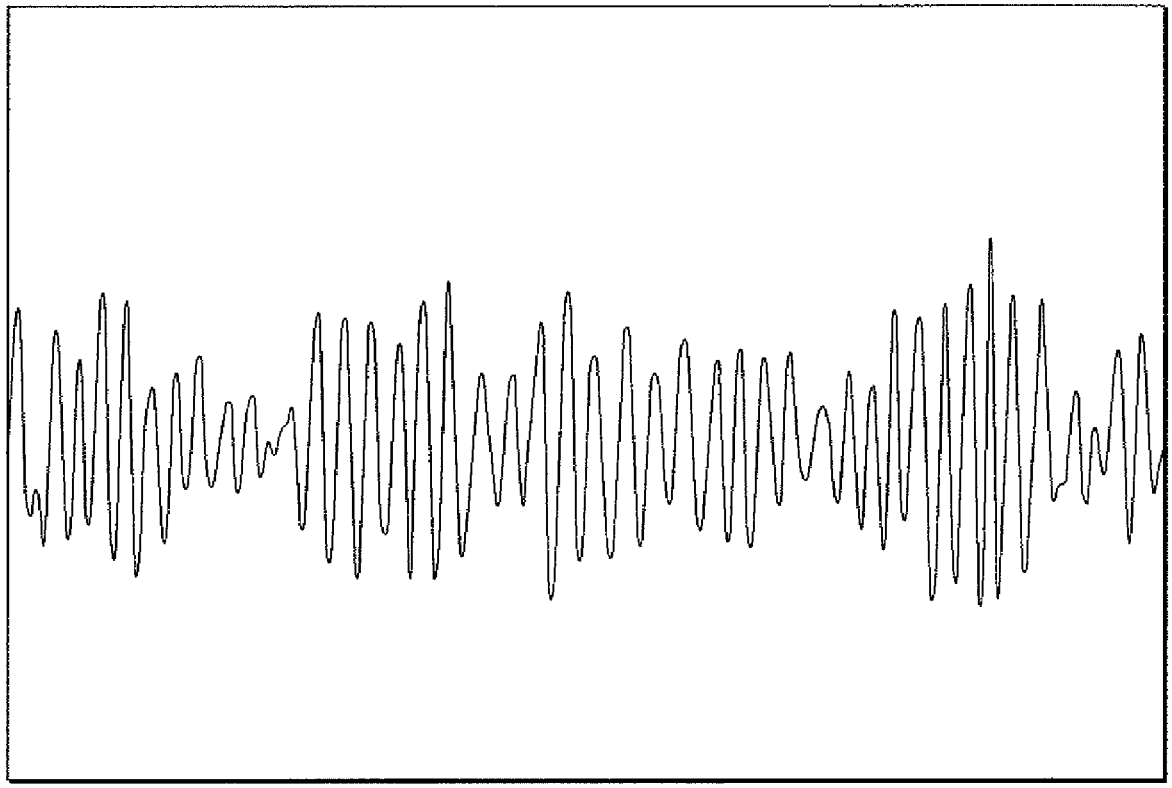
FIG. 3 is a graph showing the vortex flow-meter output of the exhaust flow under pulsating flow conditions using the smoothing filter of the invention.
Figure 4:
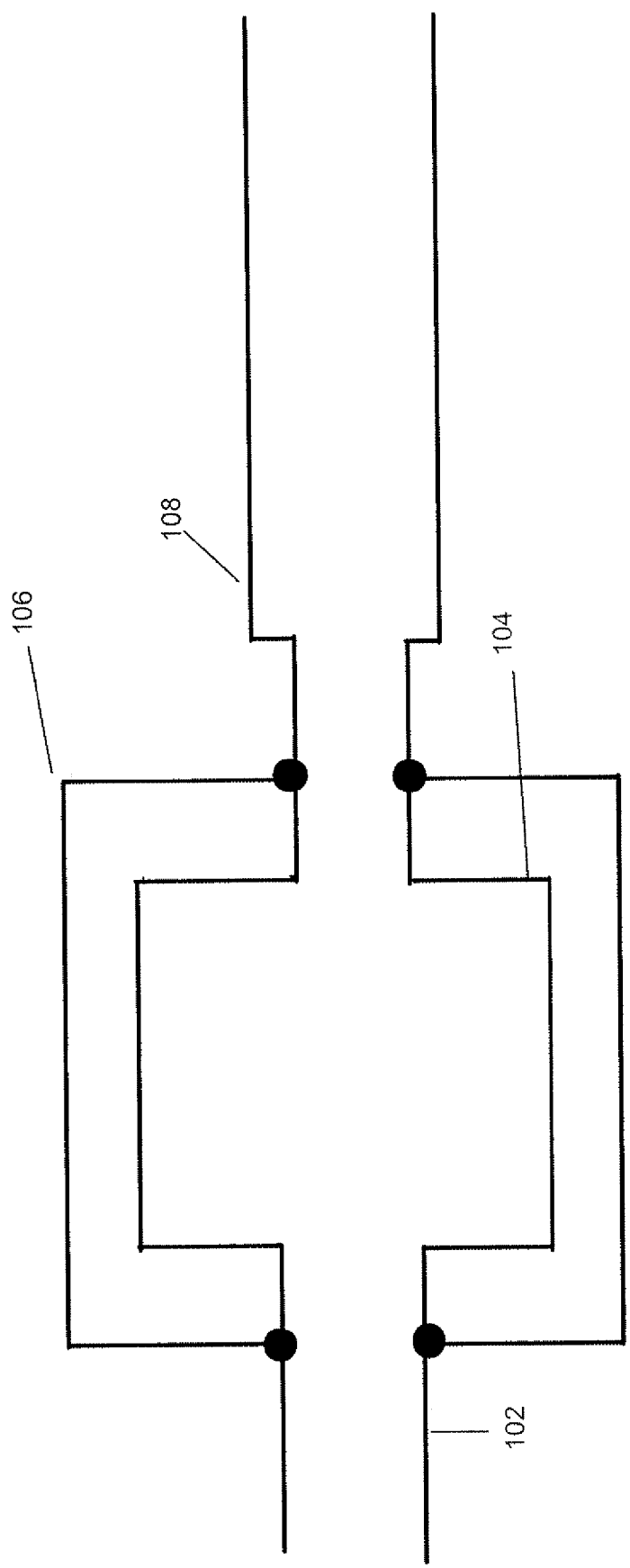
FIG. 4 is a block diagram illustrating the method of the invention.

Now referring to FIG. 4, the method of the invention is further demonstrated. An automobile exhaust system 102 is shown leading into an expandable enclosure 104. The expandable enclosure 104 is further surrounded by a protective cover 106. The expandable cover 104 is attached to a primary flow measurement device 108.

A review of the test data appears to indicate that the surface area of the box and the box's ability to expand and contract with low pressures, is more important than the shape of the box. The location of the inlet and exit connections were varied to determine the pressure loss of the filter. Locations directly opposite of each other caused the lowest pressure loss, and the location of the connections did not affect the smoothing of the flow.

This smoothing approach of using boxes was also tested using larger engines with a displacement of 3.8 liters and having six cylinders. The inherent lower pulsations of the larger number of cylinders required less smoothing, but the improvement using any of the boxes was noticeable.

The exhaust meter response time was measured both with and without the box filter, with no statistical difference observed.

This filtering concept using a box with expandable sides is a new and novel approach that will allow a major change in the emissions testing of automobiles. Using a box of a shape other than as described herein will also produce the desired effect of smoothing the exhaust flow. Since exhaust flow is very corrosive and exhaust gas temperatures can be as high as 1000° F., the material used for the box must be capable of handling these high temperatures and be corrosion resistant. Therefore, in the actual tests, stainless steel was used and is the preferred material. However, there are other materials that might be equally suitable. An additional advantage of the invention in using a solid box to smooth the exhaust flow is that the small size of the box will allow for heating blankets to be used to prevent condensation of the exhaust gas.

Having thus described the invention in connection with the preferred embodiments thereof, it will be evident to those skilled in the art, that various revisions can be made to the preferred embodiments described herein, without departing from the spirit and scope of the invention. It is my intention, however, that all such revisions and modifications that are evident to those skilled in the art will be included within the scope of the following claims.

What is claimed is as follows:

1. A method of improving the measurement of the flow of gases from an exhaust system where the flow pulsates and/or reverses, the method comprising the steps of:
   providing a primary flow measurement device in the flow of gases to measure the primary flow;
   adding to the primary flow of gases upstream from the primary flow measurement device an expandable enclosure that will expand with pressure pulsations and then contract so as to create a smooth flow of gases at the measurement device; the expandable enclosure downstream from the exhaust system; the enclosure physically expanding and contracting with the pressure pulsations.

2. The method of claim 1 in which the measurement of the flow of gases is from automobile exhaust and the enclosure has a minimum volume of at least 1700 cubic inches.

3. The method of claim 1, in which the enclosure has walls of a thin non-corrosive material.

4. The method of claim 3, in which the walls of the enclosure are made of stainless steel.

5. The method of claim 3, in which the walls are of a thickness in the range of 0.005 to 0.015 inches.

6. The method of claim 5 in which the walls of the enclosure are covered with a protective cover spaced from the walls.

7. The method of claim 6 in which the protective cover is provided with openings that allow air to be exhausted from the space between the walls and the cover as the walls expand.

* * * * *